(12) United States Patent
Carpena et al.

(10) Patent No.: US 6,489,531 B1
(45) Date of Patent: Dec. 3, 2002

(54) CONFINEMENT OF CAESIUM AND/OR RUBIDIUM IN APATITIC CERAMICS

(75) Inventors: Joëlle Carpena, Jouques (FR); Nadège Senamaud, Limoges (FR); Didier Bernache-Assolant, Limoges (FR); Jean-Louis Lacout, Toulouse (FR); Christian Pin, Clermont-Ferrand (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/856,145

(22) PCT Filed: Nov. 29, 1999

(86) PCT No.: PCT/FR99/02945

§ 371 (c)(1),
(2), (4) Date: May 30, 2001

(87) PCT Pub. No.: WO00/33321

PCT Pub. Date: Jun. 8, 2000

(30) Foreign Application Priority Data

Nov. 30, 1998 (FR) .............................. 98 15043

(51) Int. Cl.$^7$ ................................. G21F 9/16
(52) U.S. Cl. ............................. 588/2; 588/14; 588/15; 588/16; 588/20
(58) Field of Search ............................ 588/1, 2, 14, 15, 588/16, 20; 252/625; 976/DIG. 385; 423/306, 326

(56) References Cited

U.S. PATENT DOCUMENTS

| | | | |
|---|---|---|---|
| 4,442,028 A | | 4/1984 | Wolf et al. |
| 5,678,233 A | * | 10/1997 | Brown ........................ 588/13 |
| 5,732,367 A | * | 3/1998 | Yost et al. ............. 405/129.25 |
| 5,771,472 A | * | 6/1998 | Carpena et al. ............. 252/625 |
| 5,926,771 A | * | 7/1999 | Brown ....................... 210/682 |
| 5,994,608 A | * | 11/1999 | Pal et al. .................... 210/682 |

FOREIGN PATENT DOCUMENTS

WO    WO 95/02886    1/1995

OTHER PUBLICATIONS

A.I. Kryukova, et al., Soviet Radiochemistry, vol. 34, No. 3, pp. 409–413, "Structure and Hydrolytic Stability of Apatite Crystals Containing Cs And Sr", May–Jun. 1992.

R.V. Boganov, et al., Radiochemistry, vol. 36, No. 5, pp. 522–531, "Possibility of Incorporating High–Level Wastes In Ceramic Matrices Based On Natural Rocks", Sep.–Oct. 1994.

* cited by examiner

Primary Examiner—Stanley S. Silverman
Assistant Examiner—Eileen E. Nave
(74) Attorney, Agent, or Firm—Oblon, Spivak, McClelland, Maier & Neustadt, P.C.

(57) ABSTRACT

The invention relates to the containment of caesium and/or rubidium, in particular $^{135}$Cs and $^{137}$Cs in an apatitic matrix of formula:

$$M_t Ca_x Ln_y (PO_4)_{6-u} (SiO_4)_u X$$

in which:

M represents Cs and/or Rb,

Ln represents at least one trivalent cation,

X represents at least one anion chosen from among $2F^-$, $S^{2-}$, $2Cl^-$, $2Br^-$, $2I^-$, $2OH^-$ and $O^{2-}$, and t, x, y, and u are such that:
0<t·2.5
2·x·8
1·y·7
0·u·6
x+y+t=10 and the total number of positive charges provided by the cations M, Ca and Ln are equal to (20+u).

19 Claims, No Drawings

CONFINEMENT OF CAESIUM AND/OR RUBIDIUM IN APATITIC CERAMICS

TECHNICAL FIELD

The present invention relates to the aim of a method for fixing caesium and/or rubidium in a mineral phase of durable containment. More precisely it relates to the fixation of radioactive caesium and rubidium resulting from the reprocessing of irradiated fuels.

The caesium resulting from the reprocessing of irradiated fuels is a long half-life fission product with extremely high volatility and diffusibility. It is thus necessary to fix it in extremely stable matrices.

In the extraction solutions issuing from reprocessing installations of spent fuels, caesium is present under the form of the following isotopes: $^{135}$Cs, $^{137}$Cs and $^{133}$Cs.

Thus, in a solution obtained from a fuel $UO_x$ irradiated at 33000 MWj/t, with decay time of 3 years, these three isotopes are found in the quantities shown in the following table 1.

TABLE 1

| Isotope | Half-life | Quantities formed (g.t-1) | Average energy (KeV) | Isotopic content |
|---|---|---|---|---|
| $^{135}$Cs | 2.3 · 10$^6$ yr | 357 | 56.3 | 10% |
| $^{137}$Cs | 30 yr | 1130 | 174.3 | 31% |
| $^{133}$Cs | stable | / |  | remainder |

Because of the long-term storage, it is thus necessary to condition the caesium in a matrix which is physically and chemically stable. In fact, this element, not inserted in the network of a defined structure not incorporated in the network of an unstable structure, tends to diffuse outside the matrix under the influence of outside agents, water in particular. Furthermore, during the production of a conditioning material, carried out at high temperature, caesium, which is very volatile, is difficult to incorporate into the matrix.

Effective storage of caesium requires its incorporation into a solid matrix which resists transport, irradiation, which is thermally stable and is inert in geological storage conditions or in long-term storage.

PRIOR ART

The present policy for conditioning non-separated nuclear waste is vitrification in borosilicate glass. In this case, the caesium is processed together with the other waste whereas it would be of great interest to have specific matrices, specially adapted to the containment of caesium separated from the other waste and/or rubidium.

More recently, it was envisaged conditioning radioactive wastes by coating them in an apatitic matrix possibly containing the actinides and lanthanides to be conditioned, as described in WO-A-95/02886 [1]. However, these matrices were not designed for conditioning caesium and/or rubidium specifically and separately whereas the policy developed nowadays is to manage long-lived radionuclides separately such as Cs. These radionuclides can be separated during reprocessing, under the form of aqueous solutions of caesium and/or rubidium nitrate or carbonate.

DESCRIPTION OF THE INVENTION

The present invention has the specific aim of providing a containment matrix intended for the conditioning of caesium and/or rubidium, with confirmed long-term durability and stability, and which guarantees not only the containment of the waste but also the protection of the environment.

According to the invention, the material for containing the radioactive caesium and/or rubidium comprises a phosphosilicated apatitic matrix including in its chemical structure the radioactive caesium and/or rubidium to be contained, this apatite corresponding to the following formula:

$$M_t Ca_x Ln_y (PO_4)_{6-u} (SiO_4)_u X$$

in which:

M represents Cs and/or Rb,

Ln represents at least one trivalent cation,

X represents at least one anion chosen from among 2F$^-$, S$^{2-}$, 2Cl$^-$, 2Br$^-$, 2I$^-$, 2OH$^-$ and O$^{2-}$, and t, x, y, and u are such that:

0<t·2.5

2·x·8

1·y·7

0·u·6 x+y+t=10, and the total number of positive charges provided by the cations M, Ca and Ln are equal to (20+u).

The utilisation in this containment material of a phosphosilicated apatite matrix is very interesting. In fact, $^{135}$Cs is a β$^-$ emitter not producing any damage to this matrix, which thus remains stable to these emissions. Furthermore, since the caesium is incorporated in the same network as the apatite, it is thus fixed and cannot diffuse through this matrix. Finally, since apatite is an extremely stable material thermally (up to 1200° C.), the $^{137}$Cs thermal effect will be of no consequence. As a result, isotopic separation between $^{135}$Cs and $^{137}$Cs will not be necessary within the framework of caesium conditioning.

Moreover, apatites have very low solubility in water, which diminishes when the temperature rises. This is a positive point for caesium conditioning, since the $^{137}$Cs present in the waste, has high thermal power, which implies a rise in temperature of the matrix containing it, but in the case of apatite, will reduce the solubility of the latter in water.

According to the invention, in order to evacuate better the heat involved by the presence of $^{137}$Cs in the apatite, its thermal conductivity can be raised by a slight substitution of iron, that is by using, for example, for Ln in the formula given above, a lanthanide and iron.

Phosphosilicated apatites corresponding to the formula given above are especially intended for caesium conditioning, but they are also appropriate for conditioning rubidium. This is particularly interesting in the case where it is not possible to separate the rubidium and caesium present together in an aqueous solution.

According to the invention, the quantity t of caesium and/or rubidium included in the apatite matrix can be varied from 0 atoms per mesh to 2.5 atoms per mesh. A quantity lower than 0.1 atoms per mesh is not of much interest since this formulation only corresponds to 1% by mass of caesium. Generally it is preferable for the quantity of Cs and/or Rb to be less than 1.5 atoms per mesh (t≦1.5) since an apatite containing a greater quantity, higher than 1.5 atom per mesh is difficult to synthesise because of the high size of the caesium ion.

In this case, there is the risk that the caesium does not enter the apatite network in substitution but in insertion. As a result, because of its high mobility, the caesium would be less linked to the network and could diffuse through the matrix.

Preferably, according to the invention, one uses an apatite in which u is equal to 1, that is a composition containing 5 phosphate groupings and 1 silicate grouping, since studies on the phosphate-silicate solid solution, that is for u ranging between 0 and 6 have shown that the caesium is incorporated best within the apatitic structure for the value u=1. For compositions apart from this value, there is a risk of seeing the caesium crystallise in the secondary phases and being less well included in the chemical structure.

In the phosphosilicated apatite corresponding to the formula given above, the total number of negative charges is brought by the anions $PO_4^{3-}$, $SiO_4^{4-}$ and $X^{2-}$. These charges are balanced by the positive charges of $Ca^{2+}$, $M^+$ and the trivalent cation Ln.

As an example $X^{2-}$, can represent $(FO_{0.5})^{2-}$. For the trivalent cation Ln, various trivalent cations can be used, in particular those belonging to the lanthanide group as well as iron and aluminium. As an example, Ln can be constituted of La alone, La in combination with Fe or furthermore Nd alone.

The present invention also has the aim of a process for containing the caesium and/or rubidium in a phosphosilicated apatite matrix corresponding to the following formula:

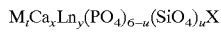
$$M_tCa_xLn_y(PO_4)_{6-u}(SiO_4)_uX$$

in which:
M represents the Cs and/or Rb to be contained,
Ln represents at least one trivalent cation, chosen for example among the lanthanides, iron and aluminium,
X represents at least one anion chosen from amongst $2F^-$, $S^{2-}$, $2Cl^-$, $2Br^-$, $2I^-$, $2OH^-$ and $O^{2-}$, and
t, x, y, and u are such that:
$0<t\leq2.5$ and preferably $0<t\leq1.5$
$2\leq x\leq8$
$1\leq y\leq7$
$0\leq u\leq6$ and preferably $u=1$
$x+y+t=10$
and the total number of positive charges provided by the cations M, Ca and Ln are equal to (20+u), which comprises the following stages:
a) preparation of an intermediary compound of theoretical formula:

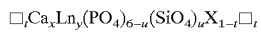
$$\square_tCa_xLn_y(PO_4)_{6-u}(SiO_4)_uX_{1-t}\square_t$$

with t, x, y and u having the meanings given above and $\square$ representing a lacuna, by mixture of compounds in stoichiometric quantities containing Ca, Ln, P, O, Si and X and calcination of the mixture at a temperature of 1200 to 1500° C.,
b) introduction of Cs and/or Rb in this intermediary compound by mixing a powder of this compound of Cs and/or Rb in the quantity required for filling the lacunae, and by calcinating the mixture at a temperature of 700 to 900° C., and
c) densification of the britholite containing the caesium and/or the rubidium obtained in b) by pressure sintering at a temperature of 900 to 1050° C., under a pressure of 25 to 35 MPa.

This process thus makes it possible to fix and immobilise caesium under atom form to provide a durable containment material.

The first stage of the process consists of mixing the appropriate reagents, that is compounds containing Ca, Ln, P, O, Si and X and calcinating the mixture at a temperature of 1200 to 1500° C. In this way an intermediary compound is obtained.

In the second stage of the process according to the invention, the caesium and/or rubidium is introduced into this intermediary compound starting from a compound of Cs and/or Rb which is mixed with a powder of the intermediary compound in the required quantity to obtain a stoichiometric apatite, and the mixture is calcinated at the appropriate temperature.

The compound of Cs and/or Rb can be obtained by drying and evaporation of a solution containing these elements, obtained after selective separation.

The last stage of the process consists of densifying the ensemble by pressure sintering.

In the first stage, one can use various compounds containing two or several of the elements to be introduced, for preparing the intermediary compound. In particular, one uses oxides, carbonates, phosphates and/or fluorides of Ln, Ca and Si.

For synthesising this intermediary compound, one can for example use the following reagents: $Ln_2O_3$, $SiO_2$, $CaCO_3$, $Ca_2P_2O_7\beta$ and $CaF_2$.

The calcium pyrophosphate $Ca_2P_2O_7\beta$ can be obtained by calcination of hydrogenophosphate of anhydrous or dihydrated calcium ($CaHPO_4$ or $CaHPO_4, 2H_2O$) at about 1000° C., for 1 to 2 hours.

These reagents are then weighed in stoichiometric quantities in function of the chemical composition targeted, then they are mixed in a liquid medium in a liquid which can be acetone, water or alcohol, for example until quasi-total evaporation of the liquid. One can dry at a temperature of 100 to 150° C., chosen in function of the liquid used, for example for 2 hours in an oven to dry the powder completely. The mixture is then calcinated at a temperature of 1200 to 1500° C. during a sufficient length of time, for example 6 hours. Preferably, the temperature is increased slowly, for example by 10° C./min, so as to evaporate all the residues completely. The time or the temperature of calcination can be raised in order to obtain a perfectly crystallised material.

This first stage of the process is easy to operate since it only uses non-radioactive reagents, and therefore does not need any particular preparations concerning radiological protection. The material used, as well as the operating personnel do not have to use any protection. This first stage thus corresponds to a classic industrial synthesis.

In order to implement the second stage of the process according to the invention, first of all the powder of the intermediary compound obtained previously is submitted to grinding so that it has a particle size of less than 10 $\mu$m, then the compound of caesium and/or rubidium is added to it, for example a carbonate or nitrate of caesium or possibly rubidium, in stoichiometric quantity, and one mixes intimately in a liquid medium following the same protocol as for the first stage until a perfectly dry powder is obtained. Next one calcinates the powder which is constituted of a mixture of the intermediary compound and reagent with caesium and/or rubidium, at a temperature of 700 to 900° C., for example 800 to 900° C., depending on the reagent used, for example for 30 minutes to eliminate the $CO_2$ of the carbonate of caesium and/or rubidium or the $NO_2$ of the nitrate of caesium and/or rubidium and to incorporate them in the intermediary compound. Thus one obtains a powder of britholite of caesium and/or rubidium.

Next comes the third stage of the process according to the invention, which consists of densifying the powder obtained. With this aim, first of all the powder is ground, for example for between 3 and 5 hours, in a liquid such as alcohol, water or acetone, by attrition, at a speed for example of the order of 450 revs/min. One can operate in a nylon jar mill with a nylon paddle and balls of 1.5 mm diameter in ceramic such as zircon or zirconia. Thus the size of the grains is reduced to make the powder more reactive. After this grinding, one has a powder of britholite with a specific surface of the order of 5 to 10 $m^2/gm$, for example 6 $m^2/gm$, which corresponds to a particle size lower than 10 $\mu m$, and preferably lower than 5 $\mu m$.

This grinding operation is indispensable because a non-ground powder has a much lower specific surface, that is a much higher particle size, which would imply pressure sintering at much higher temperatures, which are higher than the volatilisation temperature of caesium. In this case, the latter would not be caught in the apatitic structure and would contaminate the environment.

Ulterior densification of the powder of ground britholite is carried out by pressure sintering in such a way as to give it good mechanical properties. The pressure sintering can be carried out by mono-axial compression. In this case, one can use a mould, preferably in graphite, or a matrix in graphite with a ceramic casing such as alumina or zirconia, the pistons and counter-pistons also preferably being in graphite, but able to be in ceramic such as alumina or zirconia.

In order to aid de-moulding after pressure sintering, the internal walls of the mould as well as the ends of the pistons and counter-pistons in contact with the powder, are coated with lubricants such as nitride of boron or alumina, if necessary.

During pressure sintering, a mono-axial pressure of 25 to 35 MPa is applied to the powder. The pressure sintering cycle consists of raising the temperature to the pressure sintering temperature, for example 900° C., followed by a stage at this temperature for about 1 hour. Once the shrinkage is completed, the pressure is withdrawn and the temperature is lowered by 5° C./min. At the end of the pressure sintering, the pastille is de-moulded without any difficulty.

Thus one obtains dense britholite containing the caesium to be contained.

This pressure sintering stage makes it possible to obtain a solid without open porosity, with a densification level close to 100%, having contained all the caesium introduced into the apatitic structure phase, chemically stable and which can be placed in a metallic drum for transport and definitive surface storage or in geological storage.

Other properties and advantages of the invention will become clearer by reading the following examples, evidently given as illustrative but non-limiting examples.

DETAILED DESCRIPTION OF EMBODIMENTS

The following examples illustrate the preparation of phosphosilicated apatites, starting from the following reagents: $Ln_2O_3$, $SiO_2$, $CaCO_3$, $Ca_2P_2O_7\beta$ and $CaF_2$. The caesium and rubidium are introduced by way of $Cs_2CO_3$, $CsNO_3$ and $RbNO_3$.

EXAMPLE 1

Synthesis of a Dense Britholite of Formula:
$Ca_8La_{1.3}Fe_{0.2}Cs_{0.5}(PO_4)_5(SiO_4)_1FO_{0.5}$ This apatite contains a weight percentage of caesium of 6.46%.

In order to obtain 10 gm of britholite corresponding to the formula given above, first of all one prepares an initial mixture in acetone using the following quantities:

| | |
|---|---|
| $CaCO_3$ | 2.7327 gm |
| $SiO_2$ | 0.5469 gm |
| $La_2O_3$ | 1.955 gm |
| $Fe_2O_3$ | 0.1453 gm |
| $Ca_2P_2O_7$ | 5.7807 gm |
| $CaF_2$ | 0.3553 gm |

All these reagents are mixed in acetone and the mixture is dried in an oven at 130° C. for two hours. This mixture is then calcinated at 1400° C. for 6 hours to make the different reagents react together and to synthesise an intermediary compound in powder form which is then ground to a particle size of less than 10 $\mu m$.

The powder obtained is then mixed with caesium carbonate, using 0.8528 gm of $Cs_2CO_3$ for 10 gm of the intermediary compound. These two reagents, intermediary compound and caesium reagent, are mixed in acetone, then dried at 130° C. The powder obtained is then calcinated at 800° C. for ½ hour. The compound obtained is then ground for 4 hours, by attrition at 450 rev/min so that the final particle size is less than 10 $\mu m$. This powder of britholite with caesium is then densified by pressure sintering, in a graphite mould with pistons and counter-pistons in graphite, at 900° C. for 1 hour, at a pressure of 30 MPa applied from the beginning of the cycle. The rate for lowering the temperature is 5° C./min.

One thus obtains a dense ceramic containing a single phase: an apatite doped with caesium.

EXAMPLE 2

Synthesis of a Dense Britholite of Formula:
$Ca_7Nd_2CS_1(PO_4)_5(SiO_4)_1FO_{0.5}$ This apatite contains a weight percentage of caesium of 10.2%.

In this case, one follows the same operational method as in example 1, but the reagents used for the preparation of the initial mixture are present in the following quantities:

| | |
|---|---|
| $CaCO_3$ | 1.2984 gm |
| $SiO_2$ | 0.5201 gm |
| $Nd_2O_3$ | 2.9122 gm |
| $Ca_2P_2O_7$ | 5.4981 gm |
| $CaF_2$ | 0.3379 gm |

After calcination of the mixture of these reagents to synthesise the intermediary compound without caesium, as in example 1, the caesium is introduced in the form of caesium nitrate $CsNO_3$. For 10 gm of intermediary compound without caesium, 1.6870 gm of $CsNO_3$ is used to introduce the caesium in stoichiometric quantity. The mixture, after drying, is calcinated at 850° C. for ½ hour. The powder of britholite with caesium is then ground by attrition for 5 hours in alcohol, at a speed of 450 rev/min to obtain a particle size of less than 10 $\mu m$. The powder is then densified by pressure sintering in the same conditions as those given in example 1.

One thus obtains a dense ceramic containing a single phase: an apatite doped with caesium.

EXAMPLE 3

Synthesis of a Dense Britholite of Formula:
$Ca_6La_{2.5}CS_{1.5}(PO_4)_5(SiO_4)_1FO_{0.5}$ This apatite contains a weight percentage of caesium of 14.3%.

In this case, one follows the same operational method as in example 1, but the reagents used for the preparation of the initial mixture are present in the following quantities:

| | |
|---|---|
| CaCO$_3$ | 0.8471 gm |
| SiO$_2$ | 0.5086 gm |
| La$_2$O$_3$ | 3.4460 gm |
| Ca$_2$P$_2$O$_7$ | 5.5663 gm |
| CaF$_2$ | 1.3218 gm |

After calcination of the mixture of these reagents to synthesise the intermediary compound without caesium, as in example 1, the caesium is introduced in the form of caesium carbonate Cs$_2$CO$_3$. For 10 gm of intermediary compound of caesium, 2.0678 gm of Cs$_2$CO$_3$ are used to introduce the caesium in stoichiometric quantity. The mixture, after drying, is calcinated at 800° C. for ½ hour. The powder of britholite with caesium obtained is then ground by attrition for 4 hours in alcohol, at 450 rev/min. The powder is then densified by pressure sintering in the same conditions as those given in example 1.

One thus obtains a dense ceramic containing a single phase: an apatite doped with caesium.

EXAMPLE 4

Synthesis of a Dense Britholite of Formula:
Ca$_7$Nd$_2$Cs$_{0.8}$Rb$_{0.2}$(PO$_4$)$_5$(SiO$_4$)$_1$FO$_{0.5}$ This apatite contains a weight percentage of caesium of 8.2%.

In this case, one follows the same operational method as in example 1, but the reagents used for the preparation of the initial mixture are present in the following quantities:

| | |
|---|---|
| CaCO$_3$ | 1.2984 gm |
| SiO$_2$ | 0.5201 gm |
| Nd$_2$O$_3$ | 2.9122 gm |
| Ca$_2$P$_2$O$_7$ | 5.4981 gm |
| CaF$_2$ | 0.3379 gm |

After calcination of the mixture of these reagents to synthesise the intermediary compound without caesium as in example 1, the caesium and rubidium are introduced in the form of caesium nitrate CsNO$_3$ and rubidium nitrate RbNO$_3$. For 10 gm of intermediary compound, 1.1283 gm of Cs$_2$CO$_3$ and 0.1277gm of RbNO$_3$ are used to introduce the caesium and rubidium in stoichiometric quantities. The mixture, after drying, is calcinated at 850° C. for ½ hour. The powder of britholite with caesium and rubidium is then ground by attrition, for 5 hours in alcohol, at 450 rev/min to obtain a particle size of less than 10 μm. The powder is then densified by pressure sintering in the same conditions as those given in example 1.

One thus obtains a dense ceramic with a single phase: an apatite doped with caesium and rubidium.

As can be seen from the examples given above, the containment process for caesium and/or rubidium according to the invention offers many advantages.

In fact, part of the equipment used and its environment do not have any need to be protected against the effects of radioactivity because the synthesis of the intermediary compound without caesium and without rubidium can be carried out without protection.

Furthermore, since this conditioning matrix only concerns caesium, it is perfectly adapted for this element and corresponds to the properties required for its conditioning. On the one hand, because of its high capacity for accepting caesium (of the order of 10%), relatively small volumes are produced for storage in a geological site. On the other hand, as a result of the high durability of the apatitic structure, storage in an open system where underground water is present is possible. A heavy charge of waste is possible through the present invention since the apatite is stable at high temperatures and the level of salting out due to chemical corrosion is low.

Finally, the long-term durability of the apatitic structure has been confirmed by natural analogues found in various and extreme geological environments over extremely long time periods. The very low solubility of the apatitic structure ensures that the caesium will not be salted out from the drums and that it will not reach the environment, this element being very polluting both because of its high diffusivity and because of its very long lifetime. Thus, the smaller volume provided by the present invention and the higher durability, particularly at high temperatures, makes storage in a geological site possible.

Thus, the apatitic structure produced by the process of the invention satisfies all the criteria required for the conditioning of caesium. $^{135}$Cs has a half-life of 2.3 million years and since it is necessary to isolate it for at least 10 half-lives, this means 23 million years. This corresponds well with the time range for which the data on the geochemical behaviour of natural apatites are available. In particular, studies have been carried out on natural apatites dating back for more than a billion years.

Therefore, the apatite is an extremely stable phase. In particular, its properties are known because apatite exists naturally. For example, apatites are often found as heavy minerals in sedimentary flows, and even after being transported over long distances, the chemical weathering and the physical degradation are limited. The slight weathering which apatite undergoes over long time periods and under extreme conditions makes it an ideal structure for the conditioning of caesium.

Reference [1]: WO-A-95/02886

What is claimed is:

1. Material for containing radioactive caesium and/or rubidium comprising a phosphosilicated apatite matrix including in its chemical structure the radioactive caesium and/or rubidium to be contained, said phosphosilicated apatite matrix corresponding to the following formula:

$$M_t Ca_x Ln_y (PO_4)_{6-u} (SiO_4)_u X$$

in which:

M represents Cs and/or Rb,

Ln represents at least one trivalent cation,

X represents at least one anion selected from the group consisting of 2F$^-$, S$^{2-}$, 2Cl$^-$, 2Br$^-$, 2I$^-$, 2OH$^-$ and O$^{2-}$, and t, x, y, and u are such that:
 $0 < t \leq 2.5$
 $2 \leq x \leq 8$
 $1 \leq y \leq 7$
 $0 \leq u \leq 6$
 $x+y+t=10$, and the total number of positive charges provided by cations M, Ca and Ln are equal to (20+u).

2. Material according to claim 1, in which the at least one trivalent cation is selected from the group consisting of lanthanides, iron and aluminium.

3. Material according to claim 2, corresponding to the formula:

$$Ca_8La_{1.3}Fe_{0.2}Cs_{0.5}(PO_4)_5(SiO_4)_1FO_{0.5}.$$

4. Material according to claim 1, in which u is equal to 1.

5. A Material according to claim 4, corresponding to the formula:

$$Ca_7Nd_2Cs_1(PO_4)_5(SiO_4)_1FO_{0.5}.$$

6. Material according to claim 4, corresponding to the formula:

$$Ca_6La_{2.5}Cs_{1.5}(PO_4)_5(SiO_4)_1FO_{1.5}.$$

7. Material according to claim 4, corresponding to the formula:

$$Ca_7Nd_2Cs_{0.8}Rb_{0.2}(PO_4)_5(SiO_4)_1FO_{0.5}.$$

8. Material according to claim 1, in which t is at most equal to 1.5.

9. Material according to claim 1, in which X represents $(FO_{0.5})^{2-}$.

10. Material according to claim 1, in which Ln represents 1) La, 2) La and Fe, or 3) Nd.

11. Material according to claim 1, in which M represents caesium.

12. Material according to claim 1, in which M represents Cs and Rb.

13. Process for containing caesium and/or rubidium in a phosphosilicated apatite corresponding to the following formula:

$$M_tCa_xLn_y(PO_4)_{6-u}(SiO_4)_uX$$

in which:
M represents the Cs and/or Rb to be contained,
Ln represents at least one trivalent cation,
X represents at least one anion selected from the group consisting of $2F^-$, $S^{2-}$, $2Cl^-$, $2Br^-$, $2I^-$, $2OH^{31}$ and $O^{2-}$, and
t, x, y, and u are such that:
$0 < t \leq 2.5$
$2 \leq x \leq 8$
$1 \leq y \leq 7$
$0 \leq u \leq 6$
$x+y+t=10$, and the total number of positive charges provided by cations M, Ca and Ln are equal to (20+u), which comprises the following stages:
a) preparation of an intermediary compound of formula:

$$\square_t Ca_x Ln_y(PO_4)_{6-u}(SiO_4)_u X_{1-t}$$

with t, x, y and u having the meanings given above and $\square$ representing a lacuna, by mixture of compounds in stoichiometric quantities containing Ca, Ln, P, O, Si and X and calcination of the mixture at a temperature of 1200 to 1500° C., b) introduction of Cs and/or Rb in the intermediary compound by mixing a powder of the intermediary compound with a compound of Cs and/or Rb in a quantity required for filling the lacuna, and/or by calcinating the mixture of the intermediary compound with the compound of Cs and/or Rb at a temperature of 700 to 900° C., and c) densification of a britholite containing the caesium and/or the rubidium obtained in b) by pressure sintering at a temperature of 900 to 1050° C., under a pressure of 25 to 35 MPa.

14. Process according to claim 13, in which the phosphosilicated apatite corresponds to the formula of claim 13 with u equal to 1 and t equal at most to 1.5.

15. Process according to claim 13, in which the compounds used for preparing the intermediary compound are selected from the group consisting of oxides, carbonates, phosphates and fluorides of Ln, Ca and Si.

16. Process according to claim 15, in which the compounds used for preparing the intermediary compound are $Ln_2O_3$, $SiO_2$, $CaCO_3$, $Ca_2P_2O_7\beta$ and $CaF_2$.

17. Process according to claim 13, in which the compound of Cs and/or Rb used in stage b) is selected from the group consisting of nitrates and carbonates.

18. Process according to claim 13, in which the intermediary compound powder used in stage b) has a particle size lower than 10 μm.

19. Process according to claim 13, in which the caesium comprises caesium 135 and/or caesium 137.

* * * * *